Patented Apr. 26, 1949

2,468,443

UNITED STATES PATENT OFFICE 2,468,443

REMOISTENING ADHESIVE COMPOSITION

Ferdinand W. Humphner, River Forest, Ill., assignor to Mid-States Gummed Paper Co., Chicago, Ill., a corporation of Delaware No Drawing. Continuation of application Serial No. 465,725, November 16, 1942. This application August 14, 1948, Serial No. 44,411

3 Claims. (Cl. 106—128)

This invention relates to an adhesive composition and product, and more particularly to a remoistening adhesive which possesses high resistance to atmospheric humidity.

This application is a continuation application of my co-pending application Serial No. 465,725, filed November 16, 1942, for Adhesive composition and product (now abandoned).

In accordance with the present invention, a combination of adhesive materials is employed to provide an adhesive which is readily remoistened by the application of water in the liquid phase, but which is at the same time highly resistant to high atmospheric humidity for prolonged periods of time. With this adhesive, a gummed tape product is formed which may be stored or otherwise maintained for long periods of time in the presence of high atmospheric humidity and will not be subject to blocking or sticking. The tape product, when used, is readily remoistened by the application of water.

Such tape products are of importance in many fields of use. For example, they are employed in the transcribing of messages on teletype or other recording devices which print directly on a strip of gummed tape. The tape is then moistened and attached to a blank to form a message. It is important that tape which is used in this field be free of blocking or sticking under high humidity conditions since the tape is ordinarily fed from an automatic dispenser which will be jammed if blocking of the tape occurs.

Tape products of this type are also important in the use of certain metered mail equipment wherein metered mail tape is affixed to letters, packages, etc. Again it is essential that the tape which is used be free of blocking or sticking so that there is no danger of jamming or causing improper release of an imprinted postage strip, regardless of the climatic conditions.

The tape of the present invention is one which may be readily and quickly remoistened with water and may be dispensed in one or more hand or automatic dispensing units in which the tape can be stored in an exposed condition or partly exposed condition for long periods of time without causing blocking of the tape or sticking of the tape in the roll or to the contact points in the machine despite extreme variation in climatic conditions.

The tape may be formed with any suitable backing material. For example, a medium weight, all sulphite, book paper or a combination of used or mixed papers may be used. If desired, a percentage of ground wood may be incorporated in the paper. Similarly, a suitable cloth backing may be used. In any event, the backing material should be one to which the adhesive may be applied in the liquid state and upon which the adhesive may be dried by heat.

The adhesive should consist of a combination of adhesive materials, including a remoistening adhesive base material and an adhesive which is substantially resistant to atmospheric humidity and at the same time readily and easily remoistened by water in the liquid phase.

The adhesive base material may be any of the conventional materials which are used as remoistening adhesives. For example, animal glue, dextrin, bone glue, fish glue, and various combinations of these adhesives may be used. All of these adhesives are readily remoistened, but are not substantially resistant to water vapor or atmospheric humidity. By adhesive base material, any adhesive of this type is intended to be included.

The humidity-resistant adhesive may also be of any suitable type or character. For example, ethers and esters of starch and esters of other carbohydrate materials, including the polysaccharides, are suitable for this purpose. Any one or combination of these materials may be used in the product, depending upon the characteristics which are desired in the product and the availability of the materials.

Among the starch esters which may be used for this purpose are starch acetate, starch propionate, and starch butyrate. Other materials which may be used are starch caproate, starch phthalate, starch succinate, starch maleate, and tribenzoyl ester of starch.

The proportions of the various materials which are used may vary substantially, depending on the type of product which it is desired to obtain. Ordinarily, between 30% and 70% of the adhesive base material and between 70% and 30% of the humidity-resistant adhesive will be used in combination.

Certain specific examples of suitable combinations of the adhesives are as follows:

1

| | | |
|---|---|---|
| Water | gallons | 100 |
| Starch acetate | pounds | 400 |
| Bone glue (135 gms. jell test) | do | 400 |

2

| | | |
|---|---|---|
| Water | gallons | 55 |
| Starch acetate | pounds | 200 |
| Bone glue (80 gms. jell test) | do | 200 |

3

Water _____ gallons__ 55
Starch acetate _____ pounds__ 150
Bone glue (175 gms. jell test) _____ do____ 250

In all of the above examples, the starch acetate may be of a medium viscosity and low acetyl value. Thus, the acetyl content may be in the neighborhood of 2% to 5%. The cold water solubility of the starch acetate is preferably less than 1%. The animal glue used in the combination preferably ranges between 70 and 200 gms. jell test.

Other suitable examples of the adhesive combination are as follows:

4

Water _____ gallons__ 55
Starch acetate _____ pounds__ 150
Methyl cellulose (medium viscosity) __do____ 50
Bone glue _____ do____ 200

5

Water _____ gallons__ 55
Starch acetate _____ pounds__ 190
Boric acid ester of glucose _____ do____ 10
Bone glue _____ do____ 200

Instead of the methyl cellulose, other suitable cellulose derivatives may, if desired, be used, while other esters of the carbohydrates may be substituted for the boric acid ester of glucose.

The quantity of the liquid adhesive which may be applied to the backing material as a coating may be varied in accordance with the service to be performed by the tape. However, it has been found that the combination of a remoistening adhesive base material and a humidity-resistant adhesive permits the use of a smaller quantity of adhesive solids in the coating while obtaining more satisfactory results than has heretofore been possible.

By a remoistening adhesive, as the phrase is used herein, I mean to include adhesive materials which, although applied in the liquid form, may be dried to form a dry adhesive layer which, upon the application of water in the liquid phase, is readily reconstituted to provide adhesive properties.

When the tape is prepared in accordance with the present invention, it may be stacked in rooms where a high atmospheric moisture exists or in places where the atmosphere is almost saturated with moisture without causing the tape to stick together. In other words, the tape may be used under conditions under which ordinary tape would immediately become unusable because of the adhesion of the tape.

While in the foregoing specification, I have set forth certain specific materials illustrating specific embodiments of my invention, it will be understood that such examples are in the nature of illustrations or modes in which the invention may be practiced and that wide variations may be made therefrom and well-known chemical equivalents substituted therefor without departing from the spirit of my invention.

I claim:

1. An adhesive composition comprising a dry remoistening mixture containing an intimate mixture of starch acetate, methyl cellulose and at least 30% of animal glue of a gel test between 70 and 200 gms., the quantity of starch acetate being sufficient to protect the mixture against atmospheric humidity.

2. An adhesive composition comprising a dry remoistening mixture containing an intimate mixture of starch acetate and at least 30% of animal glue of a gel test between 70 and 200 grams, the quantity of starch acetate being sufficient to protect the mixture against atmospheric humidity.

3. An adhesive composition comprising a dry remoistening mixture containing an intimate mixture of starch acetate, boric acid ester of glucose and at least 30% of animal glue of a gel test between 70 and 200 grams, the quantity of starch acetate being sufficient to protect the mixture against atmospheric humidity.

FERDINAND W. HUMPHNER.

REFERENCES CITED

The following references are of record in the file of this patent:

UNITED STATES PATENTS

| Number | Name | Date |
|---|---|---|
| 2,137,170 | Levey | Nov. 15, 1938 |
| 2,144,610 | Bauer | Jan. 24, 1939 |
| 2,340,338 | Murray | Feb. 1, 1944 |